US008520282B2

(12) United States Patent
Obara et al.

(10) Patent No.: US 8,520,282 B2
(45) Date of Patent: Aug. 27, 2013

(54) OPTICAL SCANNING APPARATUS CONFIGURED TO DEFLECT AND SCAN LASER BEAM BY USING MEMS MIRROR

(75) Inventors: Mitsuhiro Obara, Mishima (JP); Junya Azami, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/340,388

(22) Filed: Dec. 19, 2008

(65) Prior Publication Data

US 2009/0161190 A1     Jun. 25, 2009

(30) Foreign Application Priority Data

Dec. 21, 2007  (JP) .................................. 2007-330956
Dec. 4, 2008   (JP) .................................. 2008-309965

(51) Int. Cl.
*G02B 26/08* (2006.01)
(52) U.S. Cl.
USPC ...................................... 359/213.1; 250/234
(58) Field of Classification Search
USPC .............. 359/196.1–226.3; 250/204, 559.06, 250/559.29, 230, 234
See application file for complete search history.

(56) References Cited

U.S. PATENT DOCUMENTS

2007/0035799 A1*   2/2007   Gomi et al. .................... 359/214
2007/0063134 A1*   3/2007   Wine et al. ..................... 250/235

FOREIGN PATENT DOCUMENTS

| JP | 62-237420 A   | 10/1987 |
| JP | 05-045603 A   | 2/1993  |
| JP | 09-193464 A   | 7/1997  |
| JP | 09-230276 A   | 9/1997  |
| JP | 2004-230629 A | 8/2004  |
| JP | 2005-195869 A | 7/2005  |
| JP | 2007-38555 A  | 2/2007  |
| JP | 2007-163931 A | 6/2007  |
| JP | 2007-171929 A | 7/2007  |

* cited by examiner

*Primary Examiner* — Jennifer L. Doak
(74) *Attorney, Agent, or Firm* — Canon U.S.A., Inc., IP Division

(57) ABSTRACT

During one cycle of reciprocating operation of a MEMS mirror, a light receiving sensor detects a falling time at which a laser beam reflected by an upstream-of-sensor mirror and scanned in one direction passes an edge of a regulation portion, and a rising time at which the laser beam scanned in the other opposed direction passes the edge of the regulation portion. A controller executes an arithmetic operation on the basis of the two times detected by the light receiving sensor and controls the operation of the MEMS mirror, which is performed by the driver, such that the detected two times are held at respective setting times.

20 Claims, 13 Drawing Sheets

OPTICAL SCANNING APPARATUS CONFIGURED TO DEFLECT AND SCAN LASER BEAM BY USING MEMS MIRROR

BACKGROUND OF THE INVENTION

1. Field of the Invention

The present invention relates to an optical scanning apparatus used in an image forming apparatus, such as a laser beam printer. More particularly, the present invention relates to an optical scanning apparatus configured to deflect and scan a laser beam by using a deflecting mirror (hereinafter referred to as an "MEMS mirror") that is manufactured on the basis of the technique called MEMS (Micro Electro Mechanical System).

2. Description of the Related Art

Japanese Patent Laid-Open No. 2005-195869 proposes an optical deflection device using a MEMS mirror that is operated to reciprocate with resonance oscillations. In comparison with an optical deflection device using a rotatable multi-faceted mirror such as a polygonal mirror, the optical deflection device using the MEMS mirror has the following superior features. The size of the optical deflection device can be greatly reduced. Power consumption is small. Theoretically, a mirror surface causes no face tangle. In particular, when the optical deflection device employs a MEMS mirror that is manufactured by using a single-crystal Si (silicon) through a semiconductor process, the optical deflection device is theoretically free from metal fatigue and has superior durability.

FIG. 14 illustrates the construction of an optical scanning apparatus proposed in Japanese Patent Laid-Open No. 2005-195869.

A laser beam emitted from a laser beam source 162 is introduced to a MEMS mirror 651 through a collimator lens 631 and a cylindrical lens 632. The MEMS mirror 651 is operated to reciprocate by a driving unit (not shown) so that the laser beam is deflected and scanned.

Most part of the deflected and scanned laser beam forms, through a scanning lens 166 and a folding mirror 168, an image on a scanned surface and is used for writing the image.

Parts of the deflected and scanned laser beam are changed in their directions by upstream-of-sensor mirrors 169a and 169b which are disposed respectively upstream of light receiving sensors 160a and 160b, and those beam parts enter the light receiving sensors 160a and 160b. The light receiving sensors 160a and 160b detect the entered laser beam electric signals and output electric signals. Reference numeral 161 denotes an optical box in which the aforementioned various components are mounted. Reference numeral 165 denotes a MEMS mirror holder for holding the MEMS mirror 651.

On the basis of the electric signals output from the light receiving sensors 160a and 160b, control is executed by monitoring, e.g., a deviation between the resonance frequency of the MEMS mirror 651 and the driving frequency of the driving unit (not shown), and changing the driving frequency and the amplitude of the driving unit (not shown) so as to provide the desired deflecting operation.

In the above-described related art, however, when the driving of the MEMS mirror 651 is controlled on the basis of the outputs of the light receiving sensors 160a and 160b, the laser beam is deflected by the reciprocating operation of the MEMS mirror 651. Therefore, the deflected and scanned laser beam enters twice each of the light receiving sensors 160a and 160b per cycle of the reciprocating operation of the MEMS mirror 651. In that case, the two laser beams entering each of the light receiving sensors are scanned bidirectionally (in opposed directions). When an electric signal at the timing at which the laser beam enters the light receiving sensor is used as a control signal for each of the opposed scanning directions, the laser beams scanned in the opposed directions differ in position and incident angle at which those laser beams start to enter a light receiving surface of the light receiving sensor, because the light receiving surface of the light receiving sensor generally has a certain width. In other words, the method of detecting the timing at which the laser beam starts to enter the light receiving surface has the problems that the laser beam is detected at different deflection angles of the MEMS mirror, and that detection and control cannot be performed in a precise manner.

A solution for overcoming those problems is to use a 2-division sensor. The 2-division sensor includes two light receiving sensors which are disposed close to each other in the scanning direction and which successively issue outputs upon passage of the laser beam over the respective sensors. The 2-division sensor outputs a signal at the time when the outputs of the two light receiving sensors intersect each other. Accordingly, regardless of whether the laser beam is scanned rightward or leftward with respect to the light receiving surface, the laser beam can be detected in a state deflected at the same deflection angle. However, the 2-division sensor is more expensive than an ordinary light receiving sensor.

SUMMARY OF THE INVENTION

According to an aspect of the present invention, even when a laser beam is deflected and scanned in opposed directions by an optical deflection device including a MEMS mirror that is operated to reciprocate, the deflected and scanned laser beam is detected at the same deflection angle by an inexpensive light receiving sensor. An inexpensive optical scanning apparatus capable of realizing optical scanning at a substantially constant speed in an image region by using the MEMS mirror is thereby provided.

According to another aspect of the present invention, there is provided an optical scanning apparatus including a laser beam source configured to emit a laser beam, a deflector configured to deflect and scan the laser beam emitted from the laser beam source, the deflector including a deflecting element that is operated to reciprocate in a first deflection direction and a second deflection direction opposed to the first deflection direction, thereby deflecting the laser beam emitted from the laser beam source, and a driver configured to operate the deflecting element, and a detecting member configured to detect the laser beam deflected and scanned by the deflector, the detecting member including a light receiving sensor arranged to receive the laser beam deflected and scanned by the deflector, and a regulation portion having an edge to regulate the laser beam entering the light receiving sensor. During one cycle of the reciprocating operation of the deflecting element, the light receiving sensor detects first timing at which the laser beam deflected and scanned in the first deflection direction by the deflector passes the edge, and second timing at which the laser beam deflected and scanned in the second deflection direction by the deflector passes the edge. The optical scanning apparatus further includes a controller configured to control the operation of the deflecting element, which is performed by the driver, based on the first and second timings detected by the light receiving sensor.

According to another aspect of the present invention, there is provided an optical scanning apparatus including a laser beam source configured to emit a laser beam, a deflector configured to deflect and scan the laser beam emitted from the laser beam source, the deflector including a deflecting element that is operated to reciprocate to deflect the laser beam emitted from the laser beam source, and a driver configured to operate the deflecting element, a holding member arranged to hold the deflecting element, and a detecting member configured to detect the laser beam deflected and scanned by the deflector, the detecting member including a light receiving sensor arranged to receive the laser beam deflected and scanned by the deflector, and a regulation portion having an edge to regulate the laser beam entering the light receiving sensor. The regulation portion is formed integrally with the holding member.

According to still another aspect of the present invention, there is provided an optical scanning apparatus including a laser beam source configured to emit a laser beam, a deflector configured to deflect and scan the laser beam emitted from the laser beam source, the deflector including a deflecting element that is operated to reciprocate in a first deflection direction and a second deflection direction opposed to the first deflection direction, thereby deflecting the laser beam emitted from the laser beam source, and a driver configured to operate the deflecting element, and a detecting member configured to detect the laser beam deflected and scanned by the deflector, the detecting member including a light receiving sensor arranged to receive the laser beam deflected and scanned by the deflector, a first regulation portion having a first edge to regulate the laser beam entering the light receiving sensor, and a second regulation portion having a second edge to regulate the laser beam entering the light receiving sensor. During one cycle of the reciprocating operation of the deflecting element, the light receiving sensor detects a first timing at which the laser beam deflected and scanned in the first deflection direction by the deflector passes the first edge, a second timing at which the laser beam deflected and scanned in the second deflection direction by the deflector passes the first edge, a third timing at which the laser beam deflected and scanned in the second deflection direction by the deflector passes the second edge, and a fourth timing at which the laser beam deflected and scanned in the first deflection direction by the deflector passes the second edge. The optical scanning apparatus further includes a controller configured to control the operation of the deflecting element, which is performed by the driver, based on the first to fourth timings detected by the light receiving sensor.

Further features of the present invention will become apparent from the following description of exemplary embodiments with reference to the attached drawings.

DESCRIPTION OF THE EMBODIMENTS

Exemplary embodiments of the present invention will be described in detail below with reference to the drawings. It is to be noted that dimensions, materials, shapes, relative locations, etc. of components used in the exemplary embodiments can be changed, as required, depending on an apparatus to which the present invention is applied and various conditions under which the apparatus operates, and they should not be construed as restricting the scope of the present invention to the following exemplary embodiments.

Figure 1:
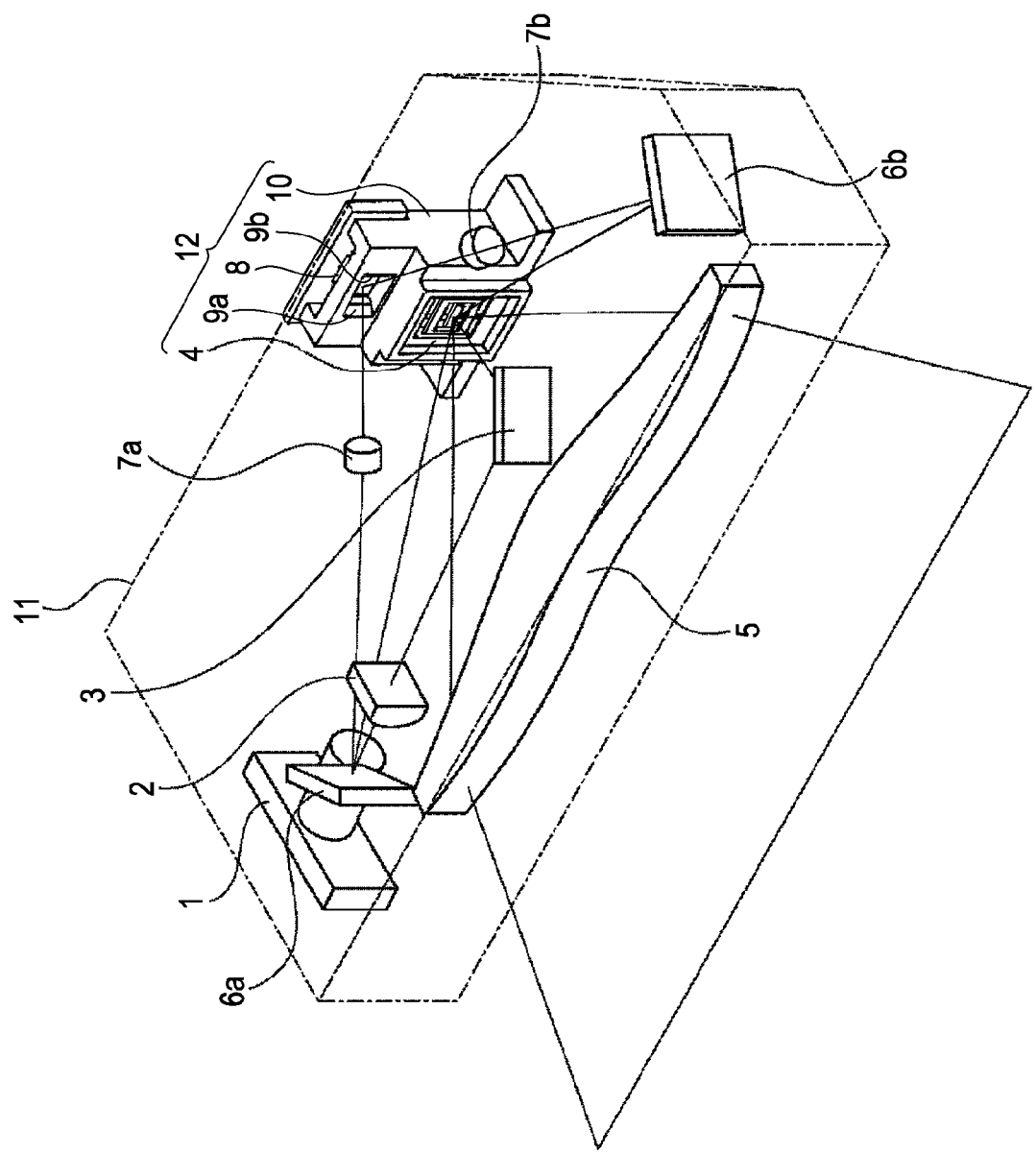
FIG. 1 is a perspective view of an optical scanning apparatus according to a first exemplary embodiment of the present invention.

FIG. 1 is a perspective view of an optical scanning apparatus according to a first exemplary embodiment of the present invention. In FIG. 1, the optical scanning apparatus includes a laser beam source unit 1, a cylindrical lens 2, a reflecting mirror 3 arranged to reflect a laser beam before it inters a deflecting element, a MEMS mirror 4 serving as the deflecting element which deflects and scans the laser beam in the main scanning direction, and a scanning lens 5 which serves as an image forming lens. The optical scanning apparatus further includes upstream-of-sensor mirrors 6a and 6b which are arranged one near each of opposite ends of the scanning lens 5 in the main scanning direction and which serve respectively as a first reflecting member and a second reflecting member, upstream-of-sensor lenses 7a and 7b, and one light receiving sensor 8. The optical scanning apparatus further includes a first regulation portion 9a and a second regulation portion 9b of a regulation member which is arranged upstream of the light receiving sensor 8 and which has a slit. The optical scanning apparatus further includes a MEMS mirror holder 10 which serves as a holding member for holding the MEMS mirror 4, and an optical box 11 in which the aforementioned optical parts are mounted. The MEMS mirror holder 10 holds the MEMS mirror 4 and the light receiving sensor 8. The MEMS mirror 4, the light receiving sensor 8, and the MEMS mirror holder 10 constitute an integral MEMS mirror unit 12.

Figure 2:
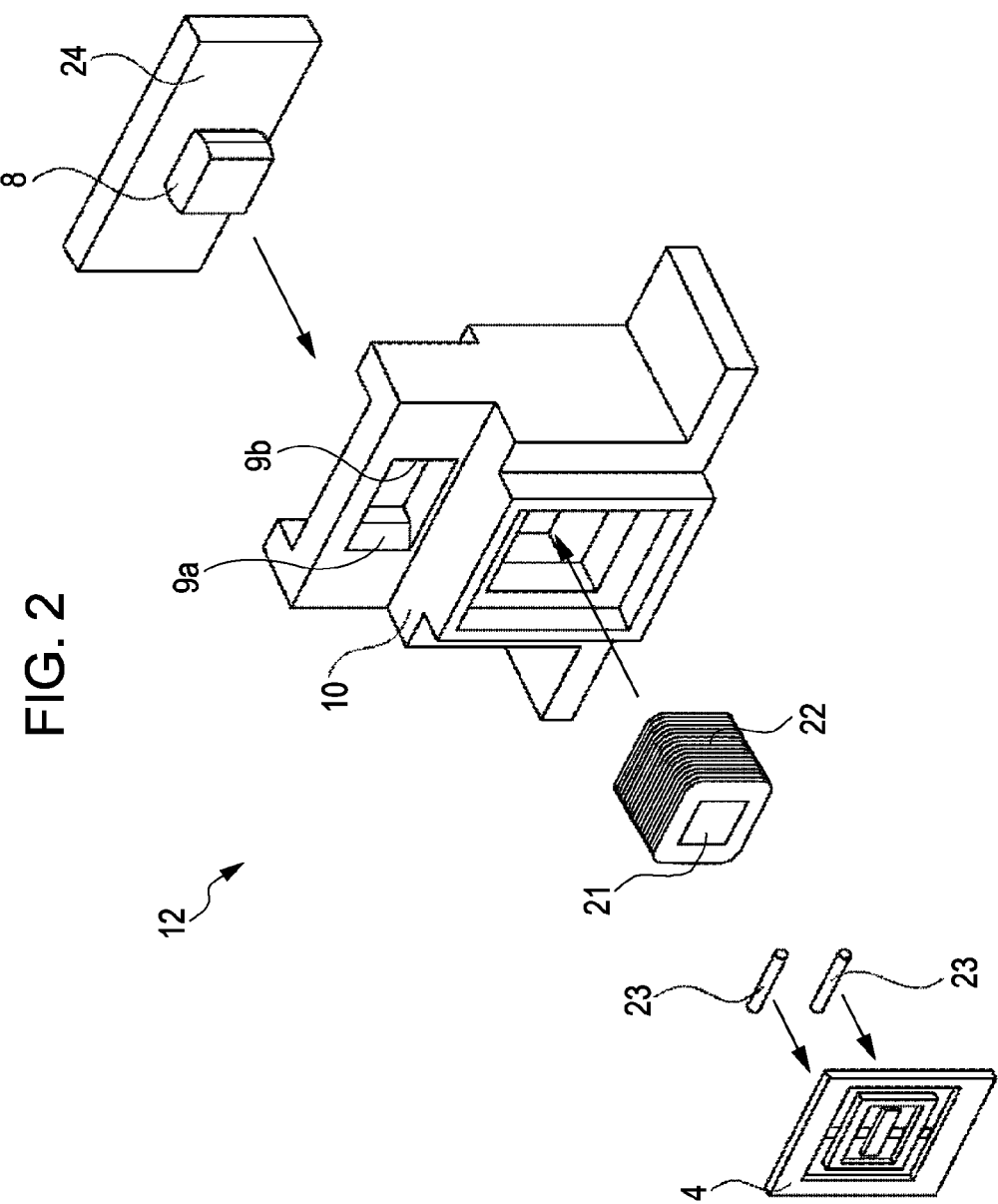
FIG. 2 is an exploded perspective view of a MEMS mirror unit used in the first exemplary embodiment.

FIG. 2 is an exploded perspective view of the MEMS mirror unit 12. In FIG. 2, the MEMS mirror unit 12 includes a core 21 and a coil 22. The core is made of a material having high magnetic permeability. The core 21 and the coil 22 constitute a driver for driving the MEMS mirror 4. The core 21 and the coil 22 are fixed to the MEMS mirror holder 10 by bonding or press-fitting, for example. Permanent magnets 23 are fixed to the MEMS mirror 4 by bonding, for example. An electric circuit board 24 including the light receiving sensor 8 mounted thereon is fixed to the MEMS mirror holder 10 by using, e.g., screws (not shown).

Figure 3:
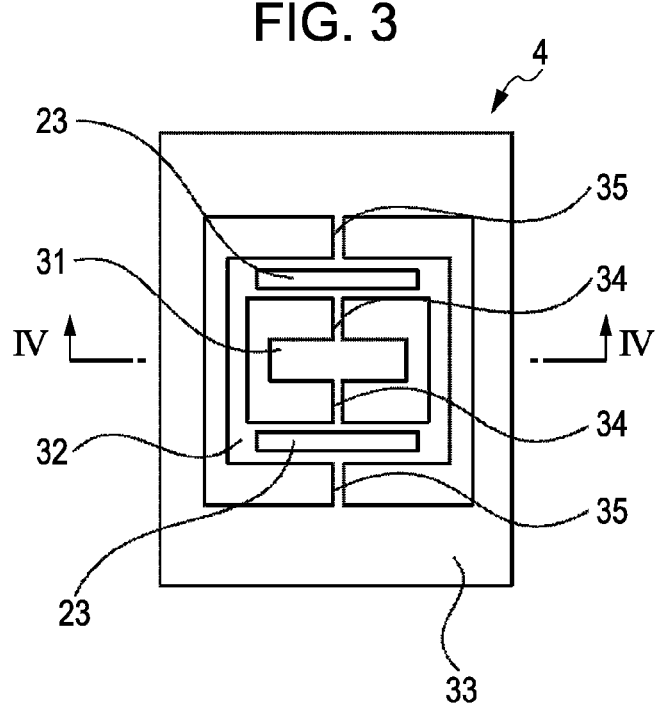
FIG. 3 is a front view of the MEMS mirror unit used in the first exemplary embodiment.

FIG. 3 illustrates the construction of the MEMS mirror 4, i.e., the deflecting element. The MEMS mirror 4 is fabricated by etching a silicon wafer, and it includes a first moving element 31, a second moving element 32, an outer frame 33, a pair of first torsion springs 34, and a pair of second torsion springs 35. The first moving element 31 serves as a reflecting mirror for reflecting the laser beam. The pair of first torsion springs 34 couple the first moving element 31 and the second moving element 32 to each other, and the pair of second torsion springs 35 couple the second moving element 32 and the outer frame 33 to each other. The permanent magnets 23 are fixed to the second moving element 32 by bonding, for example. The first moving element 31, the second moving element 32, the pair of first torsion springs 34, and the pair of second torsion springs 35 constitute an oscillation system having two oscillation modes. The oscillation system is constituted such that the natural frequency of one oscillation mode is substantially twice that of the other oscillation mode.

Figure 4:
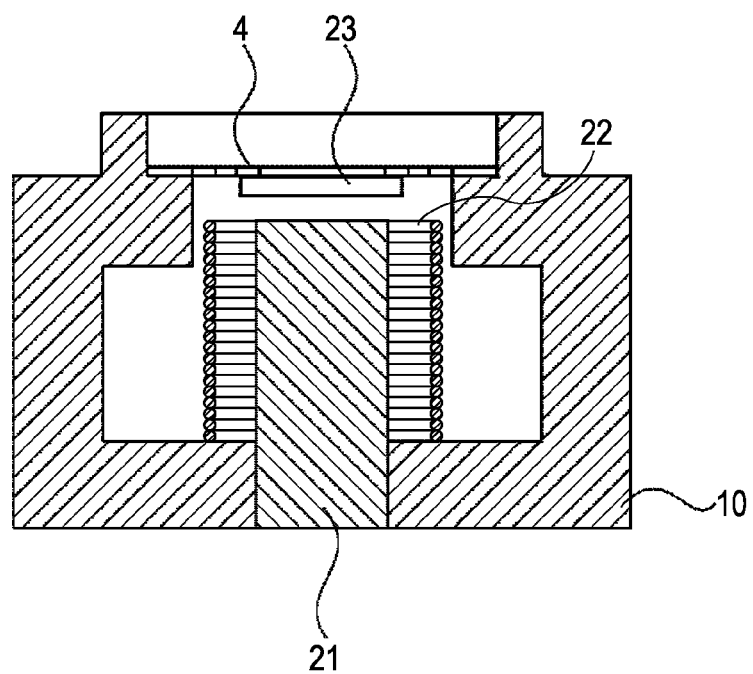
FIG. 4 is a sectional view, taken along a line IV-IV in FIG. 3, of the MEMS mirror unit used in the first exemplary embodiment.

FIG. 4 is a sectional view, taken along a line IV-IV in FIG. 3, of the MEMS mirror unit 12. As shown in FIG. 4, the core 21 is arranged at a position to face the permanent magnets 23, and the coil 22 is wound around the core 21. The permanent magnets 23, the core 21, and the coil 22 constitute an electromagnetic actuator. When a current is supplied to flow through the coil 22, torque is generated to act upon the permanent magnets 23, whereby the second moving element 32 is driven. The MEMS mirror 4 and the electromagnetic actuator constitute a deflector.

Figure 5:
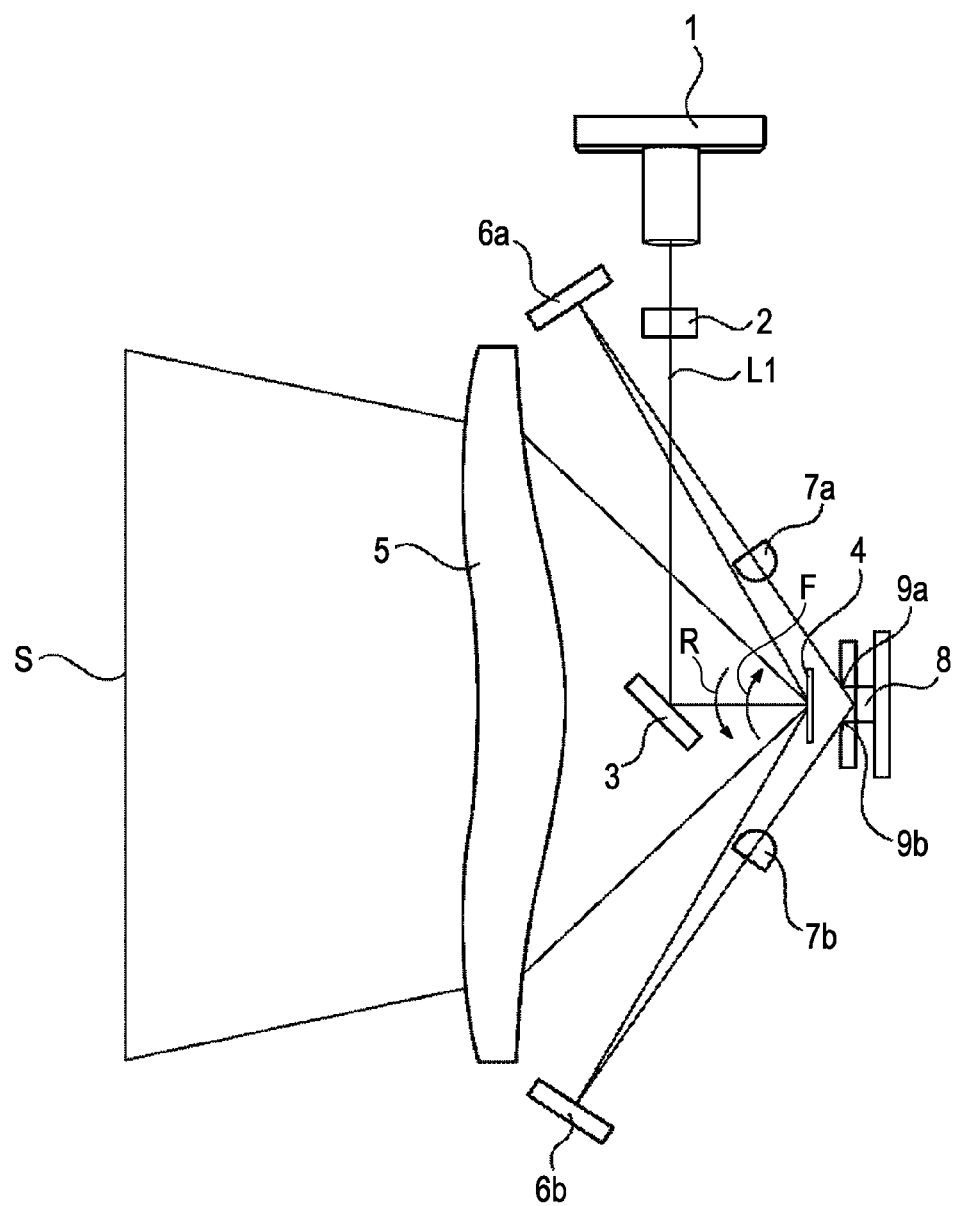
FIG. 5 is a schematic conceptual view of an optical system including two regulation portions in the optical scanning apparatus according to the first exemplary embodiment.

The operation of the optical scanning apparatus according to the first exemplary embodiment will be described below with reference to FIG. 5. FIG. 5 illustrates an optical system including two regulation portions in the optical scanning apparatus according to the first exemplary embodiment. The laser beam source unit 1 emits a laser beam L1 that is substantially parallel or has a desired rate of convergence. The laser beam L1 passes through the cylindrical lens 2 and is condensed only in the sub-scanning direction (i.e., the direction normal to the drawing sheet of FIG. 5). The sub-scanning direction is substantially perpendicular to the main scanning direction. Further, the laser beam L1 is changed in its direction by the reflecting mirror 3 and enters the MEMS mirror 4 as a liner image extending in the main scanning direction. The laser beam is deflected and scanned by the MEMS mirror 4 that is driven by the electromagnetic actuator so as to swing in a reciprocal manner. Then, the laser beam passes through the scanning lens 5 and forms an image on a scanned surface. Parts of the laser beam having been deflected and scanned by the MEMS mirror 4 enter respectively the upstream-of-sensor mirrors 6a and 6b, i.e., two reflecting members which are arranged one near each of the opposite ends of the scanning lens 5 in the main scanning direction, whereby those parts are changed in their directions for return toward the side in which the MEMS mirror 4 is arranged. More specifically, the laser beams having been reflected by the upstream-of-sensor mirrors 6a and 6b, respectively, enter the one light receiving sensor 8 after passing through a slit formed between the first regulation portion 9a and the second regulation portion 9b of the regulation member. The one light receiving sensor 8 and the regulation member, which is arranged upstream of the light receiving sensor 8 and includes the first regulation portion 9a and the second regulation portion 9b, constitute a detection unit.

The laser beam is deflected and scanned with the reciprocal swinging operation of the MEMS mirror 4 about a rotary shaft. Therefore, when the laser beam is deflected and scanned in the direction of an arrow F (i.e., a first deflection direction) at a certain time, the laser beam enters the light receiving sensor 8 through the upstream-of-sensor mirror 6a, i.e., the first reflecting member. Upon the swinging operation of the MEMS mirror 4 reaching a maximum swing angle, the deflection direction of the laser beam is reversed such that the laser beam is deflected and scanned in the direction of an arrow R (i.e., a second deflection direction) and enters the light receiving sensor 8 again through the upstream-of-sensor mirror 6a. After the laser beam has passed a beam incident region of the scanning lens 5 to form a scanning line S on the scanned surface, the laser beam now enters the light receiving sensor 8 through the upstream-of-sensor mirror 6b, i.e., the second reflecting member. Further, after the swinging operation of the MEMS mirror 4 has reached a maximum swing angle and the deflection direction of the laser beam has been reversed again, the laser beam enters the light receiving sensor 8 again through the upstream-of-sensor mirror 6b. Accordingly, during one cycle of the reciprocating operation of the MEMS mirror 4, the laser beam enters the light receiving sensor 8 four times, and the light receiving sensor 8 generates four signal outputs in a one-to-one relation to the four incidences of the laser beam. Thus, incidence timing (time) of the laser beam can be detected four times per cycle of the reciprocating operation of the MEMS mirror 4.

Figure 6:
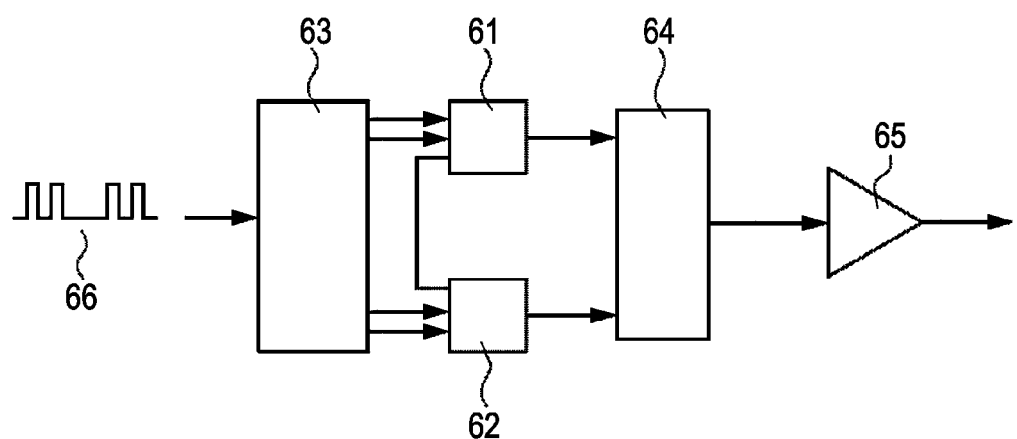
FIG. 6 is a block diagram of a controller for controlling driving of the MEMS mirror used in the first exemplary embodiment.

In this exemplary embodiment, optical scanning at a substantially constant angular speed is realized in an image region (i.e., a region covered by the laser beam passing through the scanning lens 5) by driving the MEMS mirror 4 in accordance with a combined waveform of two frequency components. FIG. 6 illustrates a controller for controlling the driving of the MEMS mirror 4. As shown in FIG. 6, the controller includes arbitrary-waveform generators 61 and 62 which generate sine waves of frequencies f and 2f. These frequencies f and 2f are substantially equal to the two natural frequencies of the above-described oscillation system. In this exemplary embodiment, f=2000 Hz (2f=4000 Hz) is set, for example. The phase and the amplitude of each sine wave can be arbitrarily changed in accordance with an instruction from a processing unit 63. The two sine waves generated by the arbitrary waveform generators 61 and 62 are added up by an adder 64 and amplified by an amplifier 65, thus causing a current to flow through the coil 22. The processing unit 63 controls the phase and the amplitude of each of the sine waves generated by the arbitrary waveform generators 61 and 62 so that four signal outputs 66 are provided at desired time intervals per cycle from the light receiving sensor 8. Thus, the controller controls the operation of the driver such that time intervals of the laser beam (i.e., four time intervals per cycle)

passing over the one light receiving sensor 8 through the upstream-of-sensor mirrors 6a and 6b are held at the desired setting times.

A control method for the MEMS mirror 4 in this exemplary embodiment will be described below.

Figure 7A:
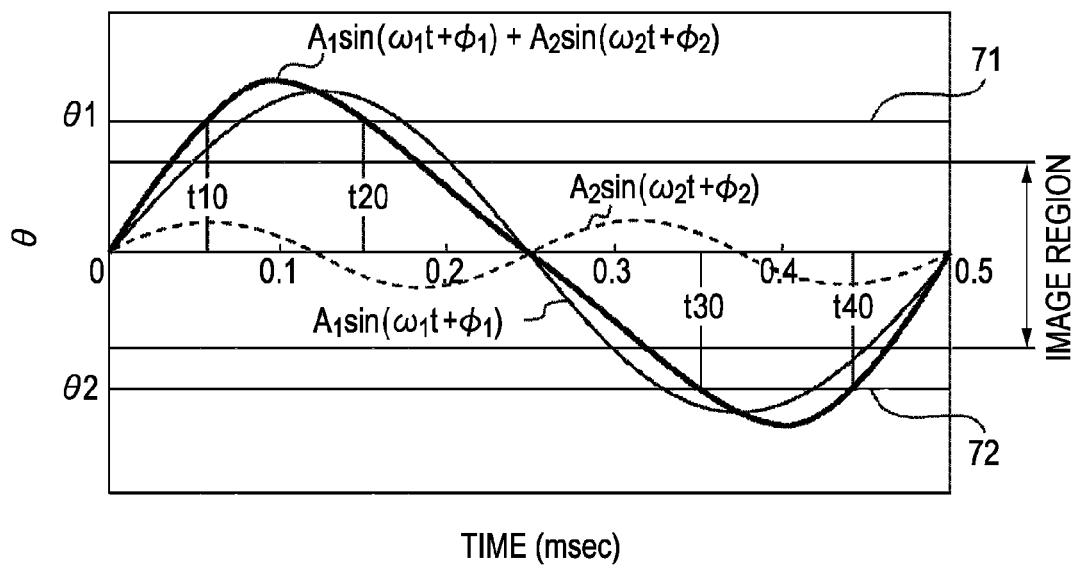
FIG. 7A is a graph representing the relationship between a deflection angle and a time in the deflecting operation of the MEMS mirror in the optical scanning apparatus according to the first exemplary embodiment.
Figure 7B:
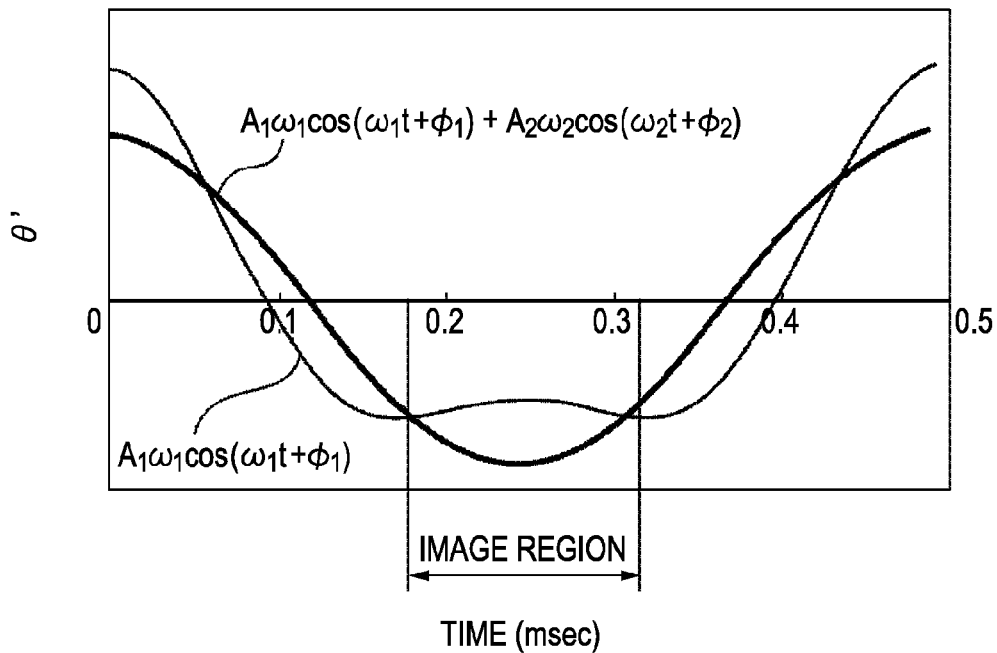
FIG. 7B is a graph representing the relationship between an angular speed and a time in the deflecting operation of the MEMS mirror in the optical scanning apparatus according to the first exemplary embodiment.

A deflection angle θ of the MEMS mirror 4 driven in accordance with the combined waveform of two frequency components is expressed by the following formula (1):

$$\theta(t)=A_1 \sin(\omega_1 t+\phi_1)+A_2 \sin(\omega_2 t+\phi_2) \quad (1)$$

where A1: amplitude of first oscillatory motion
ω1: angular frequency of first oscillatory motion
φ1: phase of first oscillatory motion
A2: amplitude of second oscillatory motion
ω2: angular frequency of second oscillatory motion
φ2: phase of second oscillatory motion
t: time on the basis of an arbitrary time within one cycle of first oscillatory motion Assuming here A1=1, A2=0.2, φ1=φ2=0, ω1=2π×2000 [Hz], and ω2=2π×4000 [Hz], the deflection angle θ and an angular speed θ' are provided as shown in FIGS. 7A and 7B, respectively. In FIG. 7A, the vertical axis represents the deflection angle θ, and the horizontal axis represents time. In FIG. 7B, the vertical axis represents the angular speed θ', and the horizontal axis represents time. Each of FIGS. 7A and 7B represents one cycle of the reciprocating operation of the MEMS mirror 4.

A thick line in FIG. 7A indicates the deflecting operation of the MEMS mirror 4, which is expressed by the formula (1) and which is closer to a saw-tooth wave than a sine wave (indicated by a thin line). As shown in FIG. 7B, this exemplary embodiment realizes a substantially constant angular speed having smaller changes in the angular speed than the sine wave in the image region (time zone of 0.18 to 0.32 msec in this exemplary embodiment).

Numerals 71 and 72 in FIG. 7A represent points at which the laser beams reflected by the upstream-of-sensor mirrors 6a and 6b enter the light receiving sensor 8 after passing respectively a first edge of the first regulation portion 9a and a second edge of the second regulation portion 9b. It is here assumed that θ1 and θ2 in FIG. 7A represent respective angles, formed by positions where those laser beams enter the upstream-of-sensor mirrors 6a and 6b just before entering the light receiving sensor 8, with respect to a center of the amplitude of the MEMS mirror 4.

Assuming here that target values of times (four points in time in total per cycle) at which the laser beams enter the light receiving sensor 8 through the upstream-of-sensor mirrors 6a and 6b are t10, t20, t30 and t40, respectively, the following values are approximately given in this exemplary embodiment:
t10=0.052 msec
t20=0.154 msec
t30=0.346 msec
t40=0.448 msec In practical control, four output times (t1, t2, t3 and t4) per cycle from the light receiving sensor 8 are periodically monitored. Then, A1, A2, φ1 and φ2 are changed such that the monitored output times are matched with the respective target values t10, t20, t30 and t40, or held within a preset allowable deviation range.

By executing the control in such manner, the optical scanning at the substantially constant speed can be realized within the image region.

When the deflector operated to reciprocate with resonance oscillations as described above is used, the deflected and scanned laser beam enters the light receiving sensor 8 twice in each of two opposed directions per cycle. The effect obtained with the edge of the regulation portion is now described. To detect the position of the laser beam, which is deflected and scanned in two opposed directions by using the MEMS mirror 4, using the one light receiving sensor 8 at the same deflection angle but without providing the regulation portion, the timing of start of incidence and the timing of end of incidence upon a light receiving surface of the light receiving sensor 8 are detected. However, detecting sharply the end-of-incidence timing on the basis of just the end of the light receiving surface is very difficult from the viewpoint of accuracy in manufacturing the light receiving sensor and its package. With an optical system not including the regulation portion, therefore, the light receiving sensor 8 cannot accurately detect the laser beam at the time when it is deflected at the same deflection angle. To avoid such a problem, in this exemplary embodiment, the regulation member having the regulation portion is disposed in addition to the light receiving sensor such that the light receiving sensor detects the timing at which the laser beam passes the edge of the regulation portion. With this arrangement, the light receiving sensor can accurately detect the laser beam at the time when it is deflected at the same deflection angle. Further, when the regulation portion is molded of a resin material and the edge of the regulation portion has an angle of 90 degrees or an acute angle, there is a difficulty in fully and uniformly spreading the resin material up to an angled edge (ridgeline) of the regulation portion when it is molded, thus resulting in a problem that the ridgeline of the regulation portion cannot be accurately molded into a desired shape. To avoid such a problem, in this exemplary embodiment, the regulation portion is molded using the resin material into a shape having a tapered surface such that the edge of the regulation portion has an obtuse angle. By using one ridgeline of the tapered surface to define an obtuse angle at the edge of the regulation portion, an edge shape having a highly-accurate linear line is obtained. Thus, since the light receiving sensor detects the timing at which the laser beam deflected by the deflector passes the edge (one ridgeline of the tapered surface) cut at high accuracy, the start-of-incidence timing and the end-of-incidence timing can be sharply detected. In addition, the regulation portion is arranged such that one edge line of the tapered surface, which serves as the edge, is aligned with the direction (i.e., the sub-scanning direction) perpendicular to the main scanning direction in which the laser beam is deflected by the deflector. With such an arrangement, even if the laser beam enters the light receiving sensor with a deviation in the sub-scanning direction due to positional deviations of various optical components which are caused by temperature changes and other factors, the timing at which the laser beam passes the edge is not shifted. As described above, in this exemplary embodiment, by using the regulation member having the regulation portion, even when the laser beam deflected and scanned in two opposed directions by using the MEMS mirror 4 enters the one light receiving sensor 8, the one light receiving sensor 8 can detect the laser beam twice at one regulation portion at the timing when the laser beam is deflected at the same deflection angle. As a result, an optical scanning apparatus can be inexpensively provided which can realize the optical scanning at the substantially constant speed within the image region by using the MEMS mirror.

Figure 8:
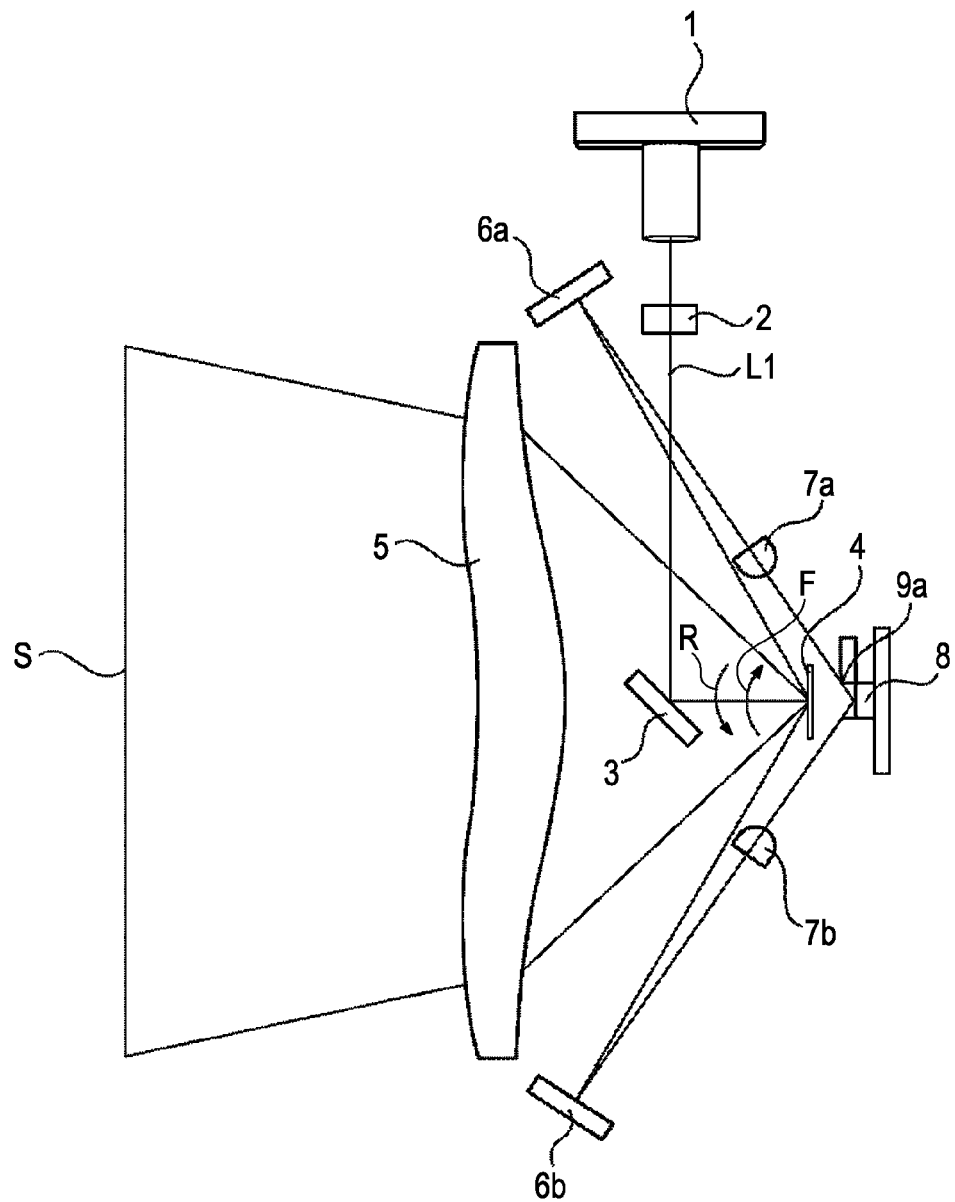
FIG. 8 is a schematic conceptual view of an optical system including one regulation portion in the optical scanning apparatus according to the first exemplary embodiment.
Figure 9A:
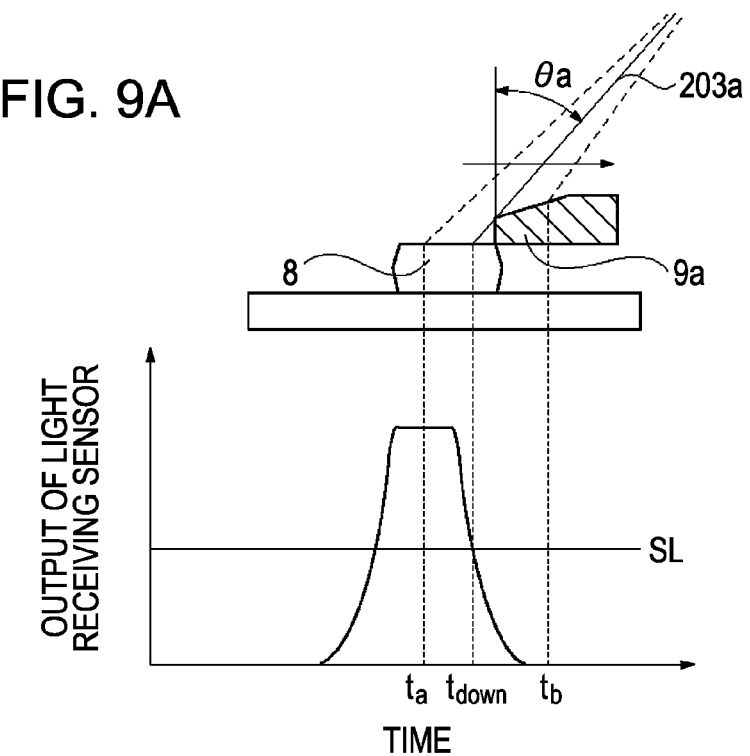
FIG. 9A is a first explanatory view representing the relationship between an output from a light receiving sensor and a scanning time when one regulation portion is used.
Figure 9B:
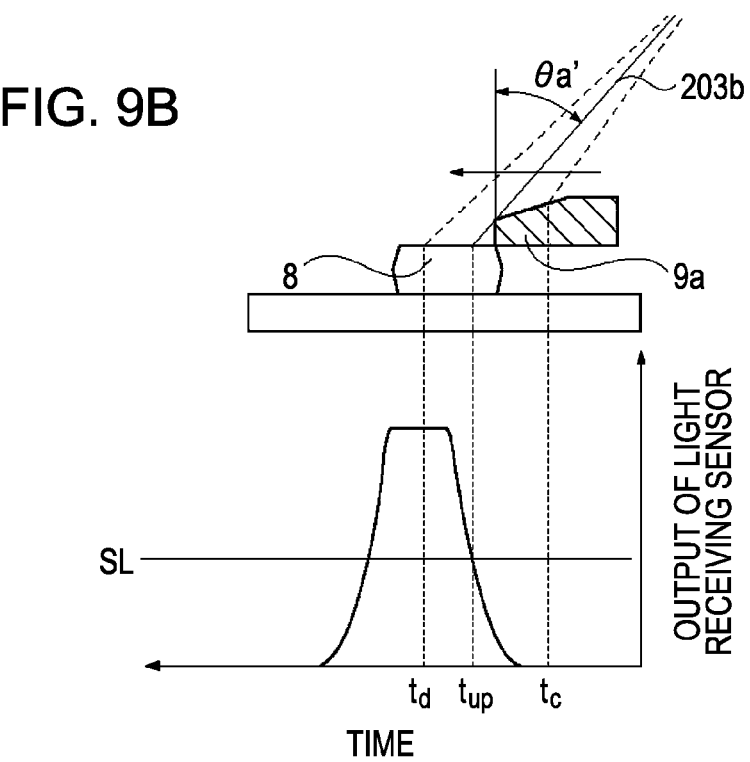
FIG. 9B is a second explanatory view representing the relationship between the output from the light receiving sensor and the scanning time when one regulation portion is used.

A detection method using the one light receiving sensor 8 and one regulation portion will be described below with reference to FIGS. 8, 9A and 9B. FIG. 8 illustrates an optical system including one regulation portion in the optical scanning apparatus according to the first exemplary embodiment. The optical system of FIG. 8 differs from the optical system described above with reference to FIG. 5 in that the latter includes two regulation portions, i.e., the first regulation portion 9a and the second regulation portion 9b, but the former includes only one regulation portion, i.e., the first regulation portion 9a. The optical system other than the regulation portion has the same construction, and so redundant description thereof is omitted. FIGS. 9A and 9B illustrate the laser beam after and before it passes the edge of the one regulation portion 9a, respectively, and corresponding outputs of the light receiving sensor 8. In FIGS. 9A and 9B, numeral 8 denotes the light receiving sensor, 9a denotes the regulation portion, and numerals 203a and 203b denote laser beams. For each of the laser beams, three light axes are indicated. Of the three light axes, two light axes indicated by broken lines represent ones before and after the laser beam passes the edge of the regulation portion 9a, and the light axis indicated by a thick line represents one used for detecting the timing (time) at which the laser beam passes the edge of the regulation portion 9a and for executing an arithmetic operation. Further, θa and θa' each denote an incident angle of the laser beam. A graph in a lower part of each of FIGS. 9A and 9B plots the output of the light receiving sensor 8 with the elapse of time. In the graph, the horizontal axis represents time, and the vertical axis represents the output of the light receiving sensor 8. Note that the laser beam is scanned in opposed directions in FIGS. 9A and 9B and, correspondingly, the time axes of two graphs are also indicated in opposed directions. When the laser beam 203a is scanned in a direction from the light receiving sensor 8 toward the regulation portion 9a as shown in FIG. 9A, the laser beam 203a enters the light receiving sensor 8 and the light receiving sensor 8 outputs a signal as indicated by a time $t_a$ in FIG. 9A until the laser beam 203a passes the edge of the regulation portion 9a. After the laser beam 203a has passed the edge of the regulation portion 9a, the laser beam 203a is blocked by the regulation portion 9a and the light receiving sensor 8 does not output a signal as indicated by a time $t_b$ in FIG. 9A. As seen from the above-described behavior, the timing (time) at which the laser beam 203a passes the edge of the regulation portion 9a is provided by a falling time of the output signal of the light receiving sensor 8. More specifically, as shown in the graph in the lower part of FIG. 9A, the light receiving sensor 8 detects, as the timing (time) at which the laser beam passes the edge of the regulation portion 9a, a time $t_{down}$ at the moment when the output of the light receiving sensor 8 is reduced beyond a certain slice level SL, as shown in the graph in the lower part of FIG. 9A.

When the laser beam 203b is scanned in a direction from the regulation portion 9a toward the light receiving sensor 8 as shown in FIG. 9B, the laser beam 203b going to enter the light receiving sensor 8 is blocked by the regulation portion 9a, as represented by a time $t_c$ in FIG. 9B, until the laser beam 203a passes the edge of the regulation portion 9a. Accordingly, the laser beam 203a does not enter the light receiving sensor 8 and the light receiving sensor 8 does not output a signal. After the laser beam 203b has passed the edge of the regulation portion 9a, the laser beam 203b enters the light receiving sensor 8 and the light receiving sensor 8 outputs a signal as indicated by a time $t_d$ in FIG. 9B. As seen from the above-described behavior, the timing (time) at which the laser beam 203b passes the edge of the regulation portion 9a is provided by a rising time of the output signal of the light receiving sensor 8. More specifically, as shown in the graph in the lower part of FIG. 9B, the light receiving sensor 8 detects, as the timing (time) at which the laser beam passes the edge of the regulation portion 9a, a time $t_{up}$ at the moment when the output of the light receiving sensor 8 is increased beyond a certain slice level SL.

By using the above-described method, θa≈θa' is obtained. This implies that, regardless of in which direction the laser beam is scanned, the timing (time) at which the laser beam passes the edge of the regulation portion 9a and enters the light receiving sensor 8 at substantially the same angle can be detected for the processing. In other words, the laser beam deflected at the same deflection angle can be accurately detected using the one light receiving sensor 8.

Figure 10A:
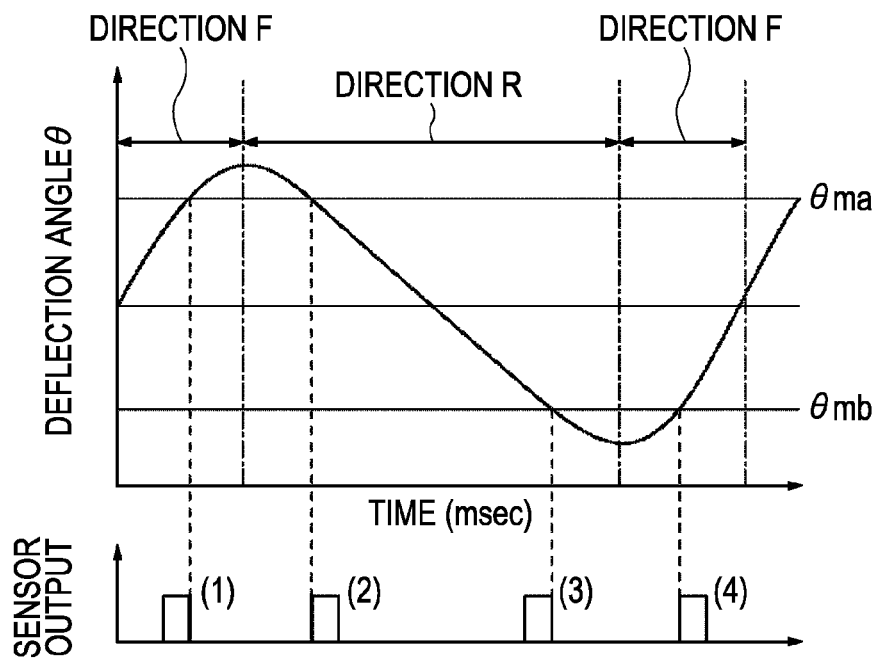
FIG. 10A is an explanatory view representing the relationship between the scanning time and each of the reflection angle of the MEMS mirror and the output from the light receiving sensor when two regulation portions are used in the first exemplary embodiment.
Figure 10B:
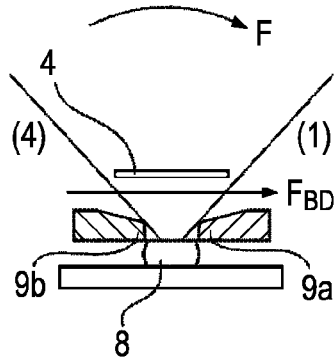
FIG. 10B is a first explanatory view representing a detection method by the light receiving sensor when two regulation portions are used in the first exemplary embodiment.
Figure 10C:
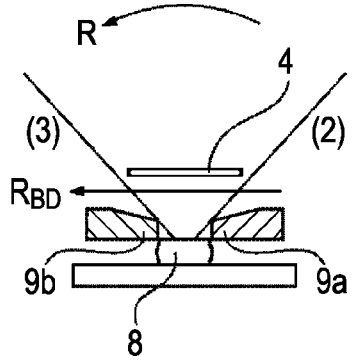
FIG. 10C is a second explanatory view representing the detection method by the light receiving sensor when two regulation portions are used in the first exemplary embodiment.

FIGS. 10A, 10B and 10C illustrate the case where the above-described signal processing method is employed in the detection unit including the regulation member which has the two regulation portions 9a and 9b. FIG. 10A includes two graphs showing the deflection angle of the MEMS mirror 4 per cycle and the output of the light receiving sensor 8. More specifically, the graph on the upper side in FIG. 10A represents the relationship between the deflection angle of the MEMS mirror 4 and the scanning time, and the graph on the lower side in FIG. 10A represents the relationship between the output of the light receiving sensor 8 and the scanning time. In the upper graph related to the deflection angle, θma represents the deflection angle of the MEMS mirror 4 when the laser beam at one end in the scanning direction passes the edge of the regulation portion 9a, and θmb represents the deflection angle of the MEMS mirror 4 when the laser beam at the other end in the scanning direction passes the edge of the regulation portion 9b. FIGS. 10B and 10C illustrate, in an enlarged scale, the surroundings of the light receiving sensor 8 in the optical system, shown in FIG. 5, of the optical scanning apparatus according to this exemplary embodiment. In FIGS. 10B and 10C, $F_{BD}$ and $R_{BD}$ represent respectively directions in which the laser beams deflected by the MEMS mirror 4 in a direction F and a direction R (opposed to the direction F) scan over the light receiving sensor 8.

Signal processing steps per cycle will be described in sequence. First, when the deflection angle of the laser beam deflected and scanned, as indicated by $F_{BD}$, in the direction F by the MEMS mirror 4 reaches θma, the laser beam passes the edge of the regulation portion 9a and the light receiving sensor 8 outputs a signal representing that timing (indicated by (1) in FIG. 10B). At that time, because the laser beam $F_{BD}$ is scanned over the light receiving sensor 8 in the direction F as shown in FIG. 10B, the timing (time) at which the laser beam passes the edge of the regulation portion 9a is represented by a falling signal of the output from the light receiving sensor 8. Thereafter, the deflection direction is reversed to the direction R and the laser beam is now scanned as indicated by $R_{BD}$. When the deflection angle of the laser beam $R_{BD}$ reaches θma again, the laser beam passes the edge of the regulation portion 9a and the light receiving sensor 8 outputs a signal representing that timing (indicated by (2) in FIG. 10C). At that time, because the laser beam $R_{BD}$ is scanned over the light receiving sensor 8 in the direction R as shown in FIG. 10C, the timing (time) at which the laser beam passes the edge of the regulation portion 9a is represented by a rising signal of the output from the light receiving sensor 8. Further, when the deflection angle of the laser beam $R_{BD}$ deflected in the direction R reaches θmb, the laser beam passes the edge of the regulation portion 9b and the light receiving sensor 8 outputs a signal representing that timing (indicated by (3) in FIG. 10C). At that time, because the laser beam $R_{BD}$ is scanned over the light receiving sensor 8 in the direction R, the timing (time) at which the laser beam passes the edge of the regulation portion 9b is represented by a falling signal of the output from the light receiving sensor 8. Thereafter, the deflection direction is reversed again to the direction F and the laser beam is now scanned as indicated by $F_{BD}$. When the deflection angle of the laser beam $F_{BD}$ reaches θmb, the laser beam passes the edge of the regulation portion 9b and the light receiving sensor 8 outputs a signal representing that timing (indicated by (4) in FIG. 10B). At that time, because the laser beam $F_{BD}$ is scanned over the light receiving sensor 8 in the direction F, the timing (time) at which the laser beam passes the edge of the regulation portion 9b is represented by a rising signal of the output from the light receiving sensor 8.

By using the above-described method, the light receiving sensor 8 can detect the laser beam deflected at the same deflection angle, i.e., the laser beam at every two ((1) and (2) on one side and (3) and (4) on the other side in FIGS. 4B and 4C) of four edge passage timings (times) of the laser beam per cycle of the reciprocating operation of the MEMS mirror 4, and can output the signals representing those times. Accordingly, the controller can execute the arithmetic operation on the basis of the four times which are output as the detection signals from the light receiving sensor, and can control the driving of the MEMS mirror 4 by the driver so that the four times are held at the respective desired setting times. The above description is made of the case where the controller controls the driving of the MEMS mirror on the basis of the four timings in total at which the laser beam passes the edges of the two regulation portions in each of the opposed directions. The above-described method can also be similarly applied to the case where the controller controls the driving of the MEMS mirror on the basis of two timings in total at which the laser beam passes the edge of one regulation portion in each of the opposed directions as shown in FIGS. 8 and 9, so long as the driving of the MEMS mirror is stabilized in a system to which this exemplary embodiment is applied. Thus, according to this exemplary embodiment, even when the optical system includes the above-described MEMS mirror which is driven in accordance with the combined waveform of plural frequency components, the controller can control the driving of the MEMS mirror on the basis of the timings at which the laser beam passes the edges of the regulation portions, and can accurately control the deflection angle of the MEMS mirror to be changed at the substantially constant speed.

Figure 11:
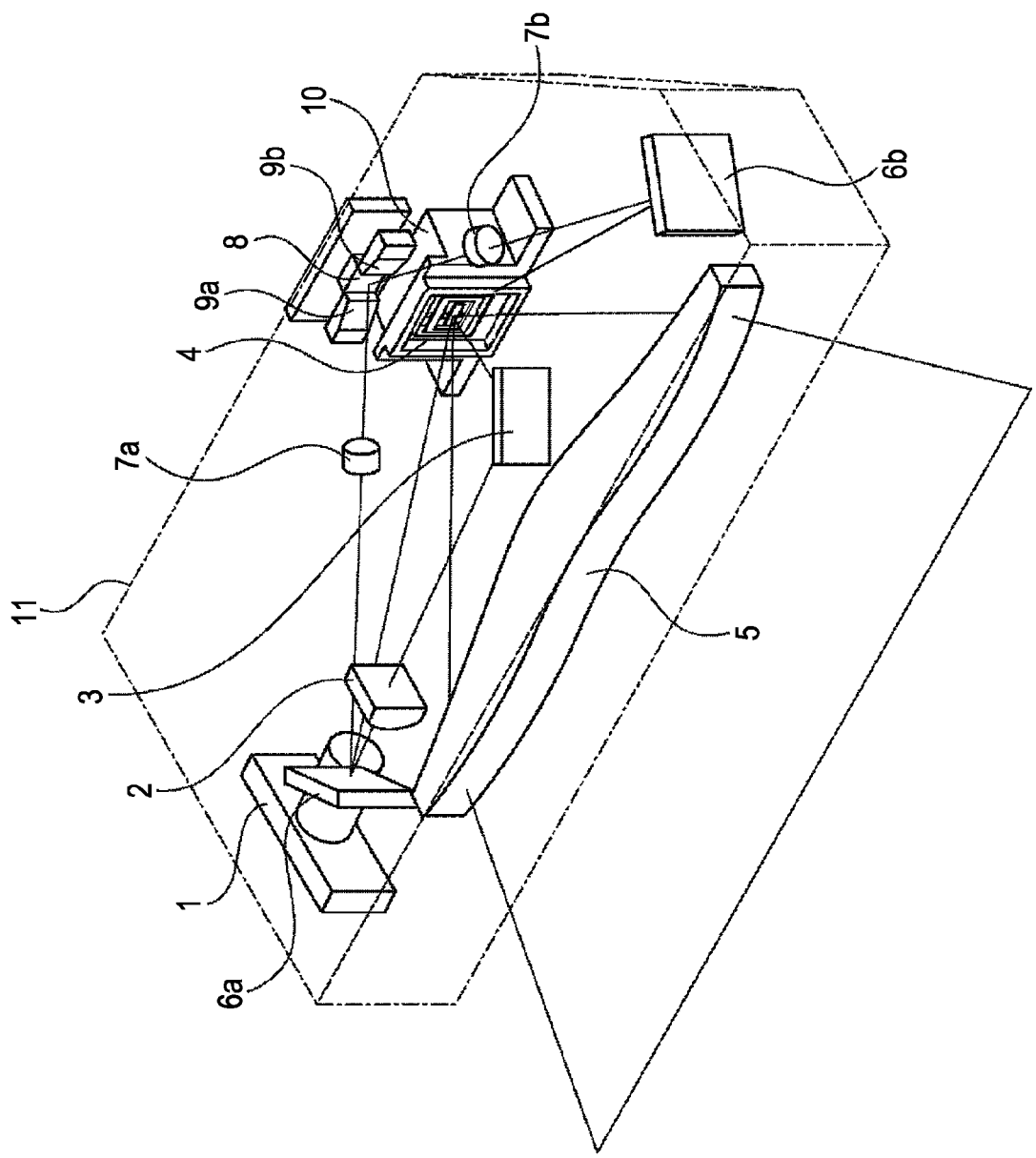
FIG. 11 is a perspective view of an optical scanning apparatus according to a modification of the first exemplary embodiment.

Further, although in this exemplary embodiment the regulation member having the regulation portions 9a and 9b is molded, as shown in FIG. 2, using the resin material integrally with the MEMS mirror holder 10 for holding the MEMS mirror 4, the construction capable of obtaining the above-described advantages is not limited to the above-described one. For example, as shown in FIG. 11, the MEMS mirror holder 10 and the regulation portions 9a and 9b may be constructed separately from each other. However, by employing the construction that the regulation member having the regulation portions 9a and 9b is molded of the resin material integrally with the MEMS mirror holder 10, as shown in FIG. 2, the manufacturing cost can be reduced in comparison with the case where the MEMS mirror holder 10 and the regulation portions 9a and 9b are molded separately from each other. Generally, the regulation portions and the MEMS mirror holder are molded of resin materials. Thus, by molding the regulation member having the regulation portions 9a and 9b integrally with the MEMS mirror holder 10 for holding the MEMS mirror 4 as in this exemplary embodiment, another advantage is obtained in that the positions of the edges of the regulation portions 9a and 9b relative to the rotary shaft of the MEMS mirror 4 are less apt to deviate. As a result, the influence of thermal expansion caused by changes of the temperature environment can be kept very small, and the optical scanning at the substantially constant speed can be prevented from deteriorating from a satisfactory state.

In addition, the driver and the light receiving sensor 8 are integrally fixed to the MEMS mirror holder 10 so as to constitute one unit, i.e., the MEMS mirror unit 12. Such an integral structure can reduce the manufacturing cost in comparison with the case where the light receiving sensor 8 and the MEMS mirror 4 are held by separate holding members. Moreover, when the control is executed as in this exemplary embodiment, the angle of the laser beam scanned by the MEMS mirror 4 with respect to a center axis of the rotary shaft of the MEMS mirror 4 is held constant when the laser beam enters the light receiving sensor 8. If that angle is not held constant, the target values (times) t10, t20, t30 and t40 are changed and the optical scanning at the substantially constant speed deteriorates. More specifically, in the case where the light receiving sensors are disposed at the opposite ends of the scanned range outside the image region as in the above-described related art, if the temperature environment, for example, is changed, the position (angle) of the light receiving sensor is changed due to thermal expansion of a holding member for holding the MEMS mirror unit, and the optical scanning at the substantially constant speed deteriorates from the satisfactory state. The holding member for holding the MEMS mirror unit corresponds to the optical box 11 in this exemplary embodiment. In general, an optical box is molded of a resin material in many cases. By constructing the light receiving sensor 8 and the MEMS mirror 4 into the integral unit as in this exemplary embodiment, however, the position of the light receiving sensor 8 relative to the rotary shaft of the MEMS mirror 4 is less apt to deviate. As a result, the influence of thermal expansion caused by changes of the temperature environment can be kept very small, and the optical scanning at the substantially constant speed can be prevented from deteriorating from the satisfactory state.

In this exemplary embodiment, as shown in FIG. 2, the light receiving sensor 8 is assembled to the MEMS mirror holder 10 on one side thereof opposed to the other side to which the MEMS mirror 4 of the MEMS mirror holder 10 is fixed. Further, the light receiving sensor 8 is disposed at a position farther away from the scanning lens 5 than the MEMS mirror 4. With such an arrangement, efficiency of work for assembling the MEMS mirror unit 12 can be increased, and the MEMS mirror 4 and the light receiving sensor 8 can be disposed close to each other in the sub-scanning direction. Hence, an optical scanning apparatus having higher assembly efficiency and a smaller size can be provided.

In this exemplary embodiment, the MEMS mirror unit 12 is constructed such that the regulation member having the regulation portions is molded integrally with the one MEMS mirror holder 10, and such that the MEMS mirror 4 and the light receiving sensor 8 are fixed to the one MEMS mirror holder 10. However, the MEMS mirror holder 10 can also be constructed of plural parts for convenience of manufacturing. In other words, in this embodiment, the holder for holding the MEMS mirror 4 and the regulation portion(s) are molded integrally with each other, and the MEMS mirror 4 and the light receiving sensor 8 are constructed into the integral unit.

Figure 12:
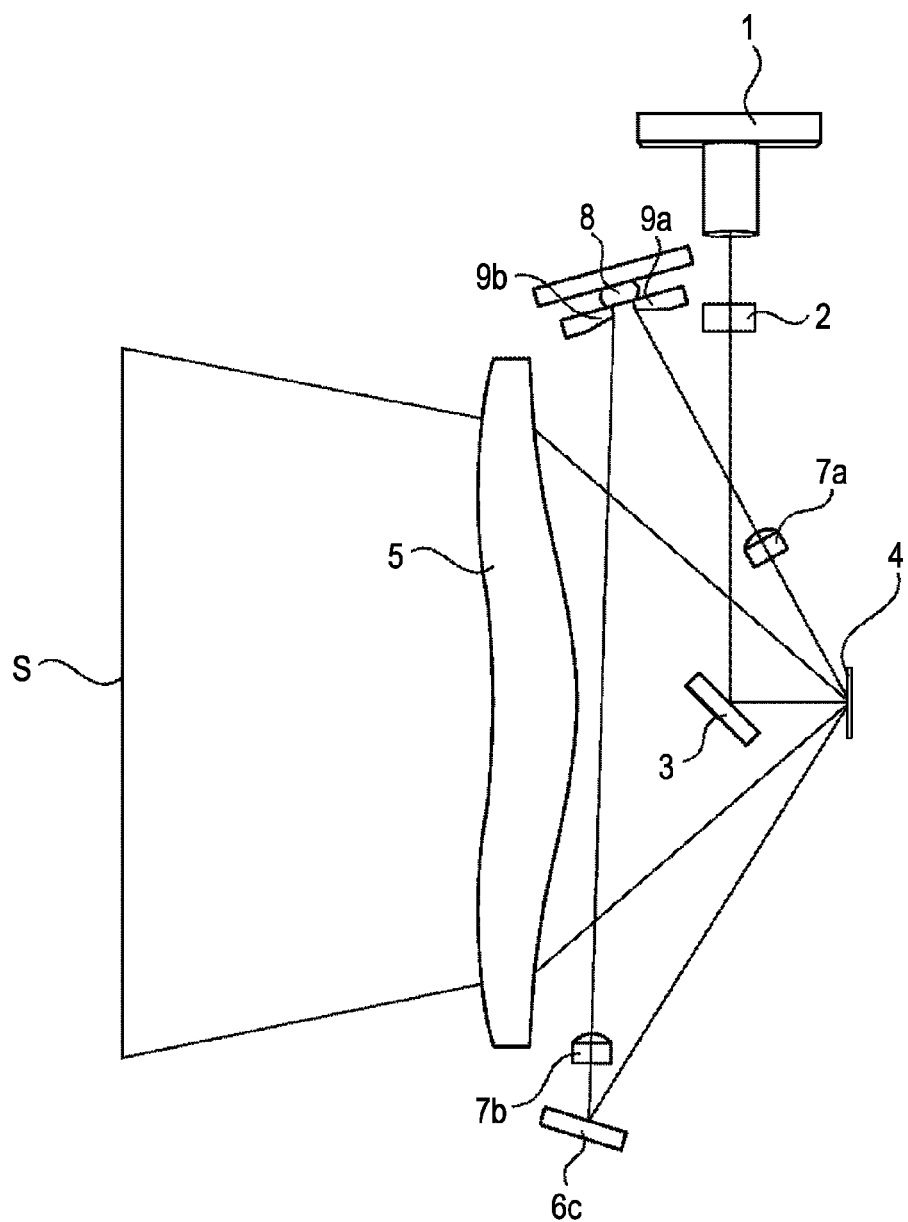
FIG. 12 is a schematic conceptual view of an optical system according to another modification of the first exemplary embodiment.

In this exemplary embodiment, the light receiving sensor 8 detects two laser beams, which are scanned in the opposed directions by the MEMS mirror 4, at the time when each laser beam is deflected at the same deflection angle. Further, those two laser beams are reflected by the upstream-of-sensor mirrors, which are disposed one near each of the opposite ends of the scanning lens, so as to enter the one light receiving sensor 8. However, the arrangement of the optical system is not limited to the above-described one. The optical system is just required to be able to accurately detect the laser beam, which is deflected and scanned in the opposed directions by the reciprocating operation of the MEMS mirror, at the same deflection angle by separately detecting and processing the rising and the falling of the edge-passage timing (time) signal input to the controller. Accordingly, the optical system can be modified, as shown in FIG. 12, such that one of two laser beams to be detected is the laser beam folded by the upstream-of-sensor mirror 6c and the other is the laser beam directly entering the light receiving sensor 8 from the MEMS mirror 4.

While the upstream-of-sensor mirrors 6a and 6b (reflecting mirrors) are used as reflecting members in this exemplary embodiment, the reflecting members are not limited to the reflecting mirrors and other suitable members can also be used so long as they have the reflecting function. For example, a reflective prism having two reflecting surfaces can be used.

Figure 13:
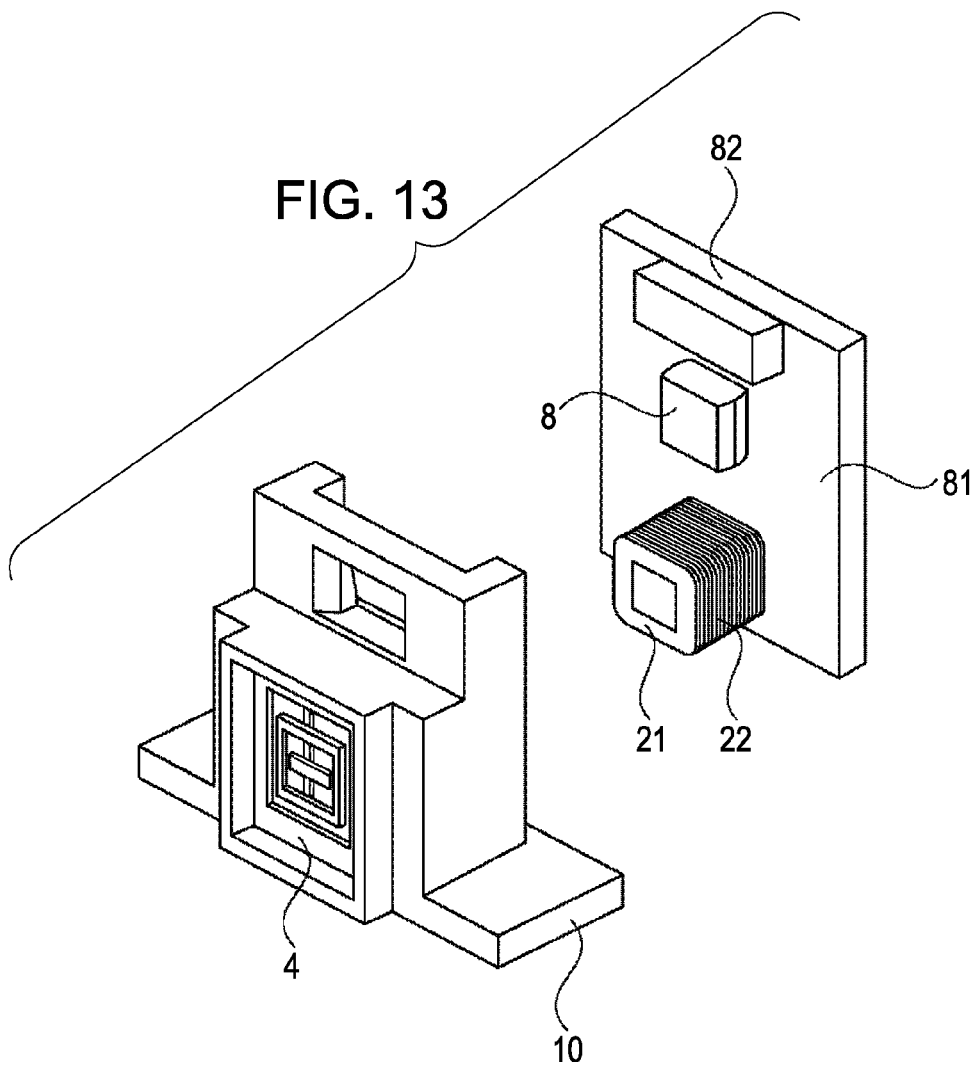
FIG. 13 is a perspective view of a MEMS mirror unit used in a second exemplary embodiment of the present invention.
Figure 14:
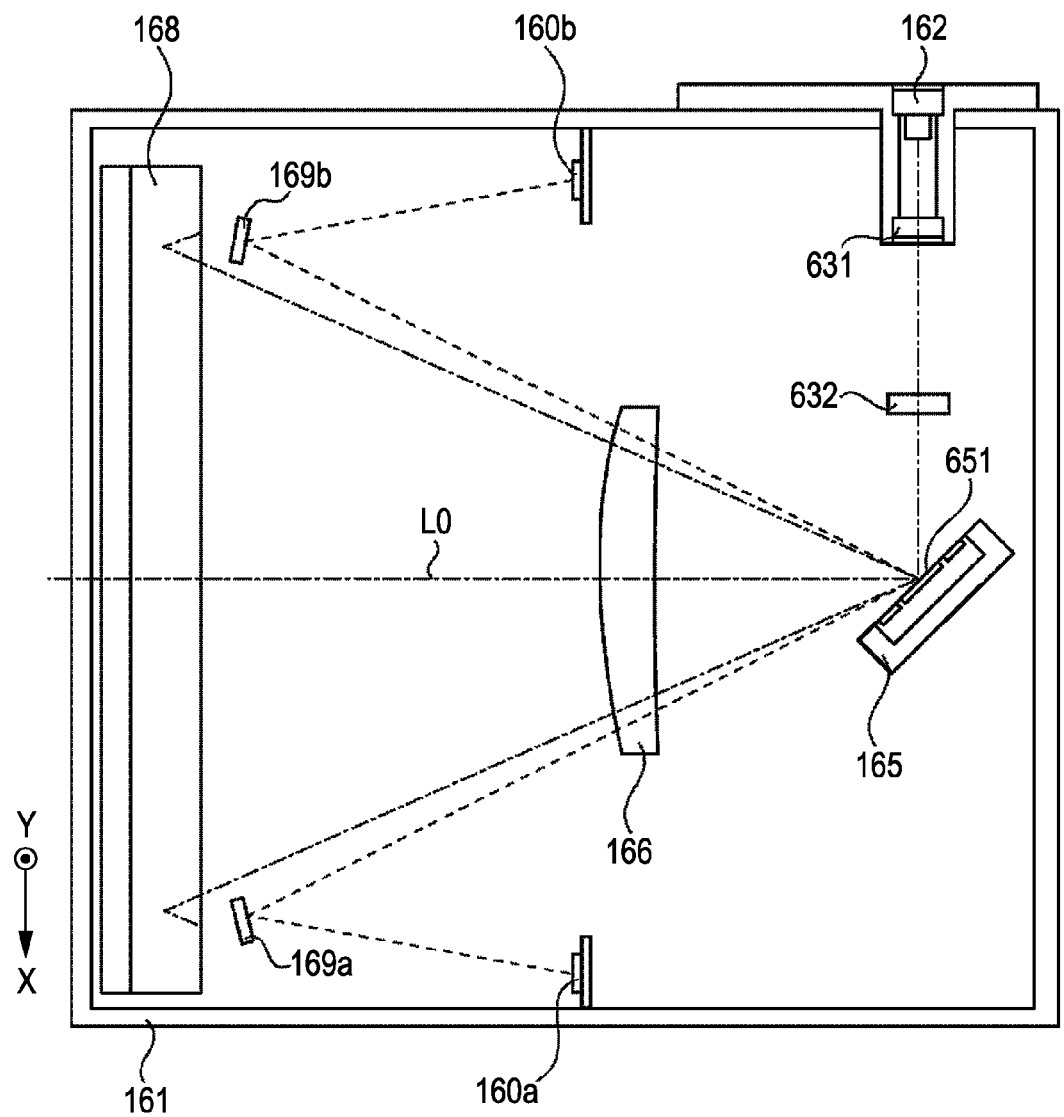
FIG. 14 is an explanatory view of an optical scanning apparatus of the related art.

FIG. 13 illustrates a MEMS mirror unit according to a second exemplary embodiment of the present invention. In FIG. 13, the MEMS mirror unit includes an electric circuit board 81 and a connector 82 mounted on the electric circuit board 81. The other construction of the MEMS mirror unit in the second exemplary embodiment is the same as that in the first exemplary embodiment, and redundant description thereof is omitted.

In the second exemplary embodiment, not only the core 21 and the coil 22 for driving the MEMS mirror 4, but also the light receiving sensor 8 are all mounted on the one electric circuit board 81.

More specifically, the coil 22 is wound around the core 21. The core 21 is fixed to the electric circuit board 81 by, e.g., bonding, caulking, or crimping. The coil 22 is electrically connected to lands (not shown) of the electric circuit board 81 by, e.g., soldering.

Further, the coil 22, an output terminal of the light receiving sensor 8, a power supply for the light receiving sensor 8, etc. are also electrically connected to the connector 82 for connection to a control circuit (not shown) through a harness (not shown).

With the above-described construction of the second exemplary embodiment, in addition to the advantages of the first exemplary embodiment, the number of parts can be reduced because the core 21 and the coil 22 for driving the MEMS mirror 4 and the light receiving sensor 8 are all mounted on the one electric circuit board 81. Further, since the coil 22 and an interface with the light receiving sensor 8 are electrically connected together to the connector 82, a MEMS mirror unit with higher assembly efficiency can be provided. However, the construction of the second exemplary embodiment is not limited to that described above.

In second exemplary embodiment, electric parts of the electromagnetic actuator, such as the core 21 and the coil 22, and the light receiving sensor 8 are mounted on the same electric circuit board 81. Other components, such as the whole or a part of the control unit, can optionally be mounted on the electric circuit board 81 as well.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-330956 filed Dec. 21, 2007 and Japanese Patent Application No. 2008-309965 filed Dec. 4, 2008, which are hereby incorporated by reference herein in their entirety.

What is claimed is:

1. An optical scanning apparatus comprising:
a laser beam source configured to emit a laser beam;
a deflector configured to deflect and scan the laser beam emitted from the laser beam source, the deflector including a deflecting portion that is operated to reciprocate in a first deflection direction and a second deflection direction opposed to the first deflection direction, thereby deflecting the laser beam emitted from the laser beam source, and a driver configured to operate the deflecting portion; and
a detecting device configured to detect the laser beam deflected and scanned by the deflector, the detecting device including a light receiving sensor arranged to receive the laser beam deflected and scanned by the deflector, and a blocking portion which is disposed upstream of the light receiving sensor in a direction in which the laser beam enters the light receiving sensor and downstream of the light receiving sensor in the first deflection direction and which is arranged to block the laser beam so as to prevent the laser beam from entering the light receiving sensor, the blocking portion being provided with an edge, being able to prevent the laser beam deflected downstream of the edge in the first deflection direction from entering the light receiving sensor, and allowing the laser beam deflected upstream of the edge in the first deflection to enter the light receiving sensor;
wherein during one cycle of the reciprocating operation of the deflecting portion, the detecting device detects a first timing at which the laser beam deflected and scanned in the first deflection direction by the deflector passes the edge, and a second timing at which the laser beam deflected and scanned in the second deflection direction by the deflector passes the edge, and
a controller configured to control the operation of the deflecting portion, which is performed by the driver, based on the first and second timings detected by the detecting device.

2. The optical scanning apparatus according to claim 1, wherein the deflecting portion includes two moving members and a torsion spring arranged to couple the two moving members with each other, and
one of the two moving members is a reflecting mirror arranged to reflect the laser beam.

3. The optical scanning apparatus according to claim 2, wherein the controller controls operation of the reflecting mirror, which is performed by the driver, in accordance with a combined waveform of a first frequency and a second frequency, the second frequency being twice the first frequency, such that the reflecting minor deflects and scans the laser beam at a substantially constant angular speed in a partial range of one cycle of the reciprocating operation of the deflecting portion.

4. The optical scanning apparatus according to claim 1, further comprising a holding member arranged to hold the deflecting portion,
wherein the blocking portion is molded integrally with the holding member.

5. The optical scanning apparatus according to claim 4, wherein the holding member and the blocking portion are molded of a resin material.

6. The optical scanning apparatus according to claim 4, wherein the light receiving sensor is fixed to the holding member.

7. The optical scanning apparatus according to claim 6, further comprising an image forming lens arranged to form an image of the laser beam deflected and scanned by the deflector on a scanned surface,
  wherein the light receiving sensor is assembled to the holding member on one side thereof opposed to the other side to which the deflecting portion is fixed, and
  the light receiving sensor is disposed at a position farther away from the image forming lens than the deflecting portion.

8. The optical scanning apparatus according to claim 6, wherein the driver is fixed to the holding member, and
  the driver and the light receiving sensor are mounted to the same electric circuit board.

9. The optical scanning apparatus according to claim 1, wherein the detecting device detects a first timing at which an output from the light receiving sensor decreases due to the laser beam passing the edge while being deflected and scanned in the first deflection direction by the deflector and a second timing at which the output from the light receiving sensor increases due to the laser beam passing the edge while being deflected and scanned in the second deflection direction by the deflector.

10. The optical scanning apparatus according to claim 9, wherein the detecting device detects a timing at which the output from the light receiving sensor decreases below a predetermined value as the first timing, and a timing at which the output from the light receiving sensor increases above the predetermined value as the second timing.

11. An optical scanning apparatus for forming an image and a scanning line on a scanned surface, the optical scanning apparatus comprising:
  a laser beam source configured to emit a laser beam;
  a deflector configured to deflect and scan the laser beam emitted from the laser beam source, the deflector including a deflecting portion that is operated to reciprocate in a first deflection direction and a second deflection direction opposed to the first deflection direction, thereby deflecting the laser beam emitted from the laser beam source, and a driver configured to operate the deflecting portion;
  an image forming lens having a scanning-line-formed region through which the laser beam deflected and scanned by the deflector passes so as to form the image and the scanning line on the scanned surface;
  a detecting device configured to detect the laser beam deflected and scanned by the deflector, the detecting device including a light receiving sensor configured to receive the laser beam deflected and scanned by the deflector; and
  a controller configured to control the operation of the deflecting portion, which is performed by the driver,
  wherein the light receiving sensor is disposed at such a position that the light receiving sensor receives both of the laser beam deflected and scanned outside one end of the scanning-line-formed region in relation to the main scanning direction and the laser beam deflected and scanned outside an opposite end of the scanning-line-formed region in relation to the main scanning direction, wherein the image is formed on the scanned surface by the laser beam that passes between the one end and the opposite end of the scanning-line-formed region, and the controller controls the operation of the deflecting portion, which is performed by the driver, based on the laser beam deflected and scanned outside the one end of the scanning-line-formed region in relation to the main scanning direction and the laser beam deflected and scanned outside the opposite end of the scanning-line-formed region in relation to the main scanning direction, detected by the light receiving sensor.

12. The optical scanning apparatus according to claim 11, wherein the deflecting portion includes two moving members and a torsion spring arranged to couple the two moving members with each other, and
  one of the two moving members is a reflecting mirror arranged to reflect the laser beam.

13. The optical scanning apparatus according to claim 12, further comprising:
  a first blocking portion having a first edge, the first blocking portion being arranged to block the laser beam so as to prevent the laser beam from entering the light receiving sensor; and
  a second blocking portion having a second edge, second blocking portion being arranged to block the laser beam so as to prevent the laser beam from entering the light receiving sensor,
  wherein during one cycle of the reciprocating operation of the deflecting portion, the detecting device detects a first timing at which the laser beam deflected and scanned in the first deflection direction outside the one end of the scanning-line-formed region in relation to the main scanning direction passes the first edge, a second timing at which the laser beam deflected and scanned in the second deflection direction outside the one end of the scanning-line-formed region in relation to the main scanning direction passes the first edge, a third timing at which the laser beam deflected and scanned in the second deflection direction outside the opposite end of the scanning-line-formed region in relation to the main scanning direction passes the second edge, and a fourth timing at which the laser beam deflected and scanned in the first deflection direction outside the opposite end of the scanning-line-formed region in relation to the main scanning direction passes the second edge, and
  wherein the controller controls operation of the reflecting mirror of the deflecting portion, which is performed by the driver, based on the first to fourth timings detected by the light receiving sensor, such that the reflecting mirror of the deflecting portion deflects and scans the laser beam at a substantially constant angular speed in a partial range of one cycle of the reciprocating operation of the deflecting portion.

14. The optical scanning apparatus according to claim 11, further comprising a holding member arranged to hold the deflecting portion,
  wherein the first blocking portion and the second blocking portion are molded integrally with the holding member.

15. The optical scanning apparatus according to claim 14, wherein the holding member, the first blocking portion and the second blocking portion are molded of a resin material.

16. The optical scanning apparatus according to claim 14, wherein the light receiving sensor is fixed to the holding member.

17. The optical scanning apparatus according to claim 16, further including an image forming lens arranged to form an image of the laser beam deflected and scanned by the deflector on a scanned surface,
  wherein the light receiving sensor is assembled to the holding member on one side thereof opposed to the other side to which the deflecting portion is fixed, and
  the light receiving sensor is disposed at a position farther away from the image forming lens than the deflecting portion.

18. The optical scanning apparatus according to claim 16, wherein the driver is fixed to the holding member, and
the driver and the light receiving sensor are mounted to the same electric circuit board.

19. An optical scanning apparatus comprising:
a laser beam source configured to emit a laser beam;
a deflector configured to deflect and scan the laser beam emitted from the laser beam source, the deflector including a deflecting portion that is operated to reciprocate in a first deflection direction and a second deflection direction opposed to the first deflection direction, thereby deflecting the laser beam emitted from the laser beam source, and a driver configured to operate the deflecting portion;
a detecting device configured to detect the laser beam deflected and scanned by the deflector, the detecting device including a light receiving sensor arranged to receive the laser beam deflected and scanned by the deflector and to produce an output corresponding to the received laser beam,
wherein during one cycle of the reciprocating operation of the deflecting portion, the detecting device detects a first timing at which the output from the light receiving sensor decreases as the laser beam leaves the light receiving sensor while the laser beam is deflected and scanned in the first deflection direction by the deflector, and a second timing at which the output from the light receiving sensor increases as the laser beam enters the light receiving sensor while the laser beam is deflected and scanned in the second deflection direction by the deflector; and
a controller configured to control the operation of the deflecting portion, which is performed by the driver, based on the first and second timings detected by the detecting device.

20. The optical scanning apparatus according to claim 19, wherein the detecting device detects a timing at which the output from the light receiving sensor reaches a predetermined value as the first timing, and a timing at which the output from the light receiving sensor reaches the predetermined value as the second timing.

* * * * *